Figure 1:
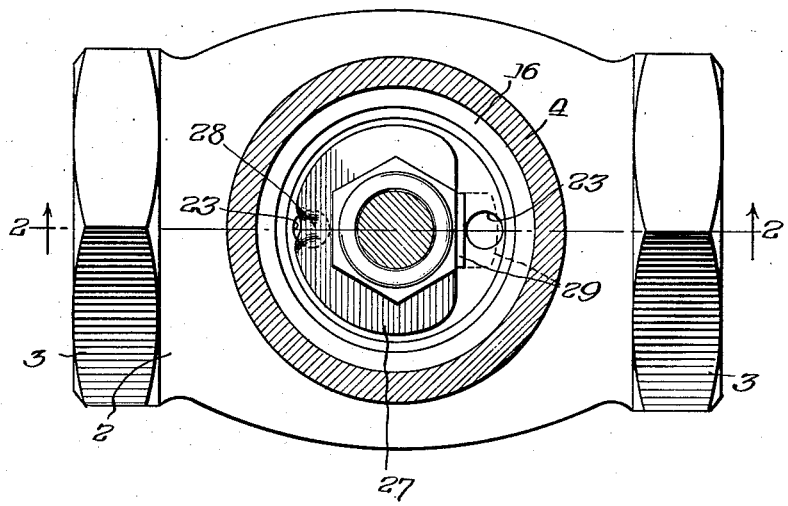

Dec. 30, 1930.　　　　　C. A. DOPP　　　　　1,787,236

VALVE

Filed Jan. 19, 1928

Witness:
Fred C. Adrian

Inventor:
Carl A. Dopp
By Fray Wilson
Atty

Patented Dec. 30, 1930

1,787,236

UNITED STATES PATENT OFFICE

CARL A. DOPP, OF CHICAGO, ILLINOIS, ASSIGNOR TO CRANE CO., OF CHICAGO, ILLINOIS, A CORPORATION OF ILLINOIS

VALVE

Application filed January 19, 1928. Serial No. 247,801.

This invention relates to valves of the globe or disc type and more particularly to an arrangement whereby the disc may be rotatably secured to the stem without danger of the parts separating from one another during operation and of a character at once simple in construction and operation.

It is desirable as will undoubtedly be appreciated that the disc of a valve of the character specified should be comparatively freely rotatable on the valve stem in order that there may be no binding between the seating surfaces when the valve is being closed. However, it has been found that unless a very expensive and difficultly manufactured connection is made between the stem and disc trouble is to be encountered in keeping the stem and disc in proper alignment or the disc from coming loose from the stem. Numerous attempts have been made to overcome these defects but all of them, so far as I am aware at the present writing, have been very expensive to manufacture or are unsatisfactory for some other reason. I have devised a very simple and inexpensive but efficient and effective coupling locking arrangement for connecting a valve disc and its stem to one another for relative rotation and of such character that relative rotation between the stem and disc will not disconnect them or in any way interfere with their proper operation, and such constitutes the primary object of my invention.

Figure 2:
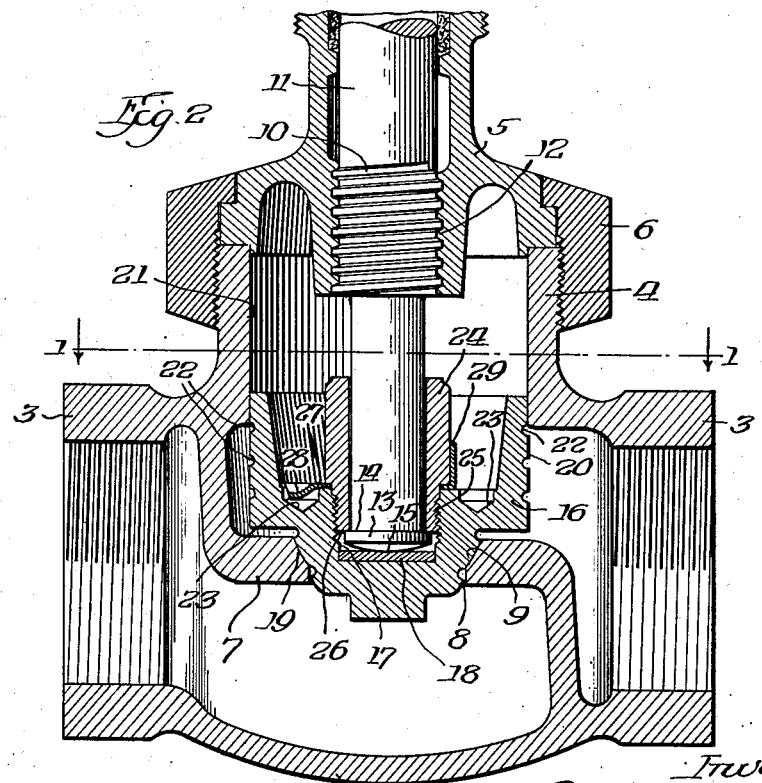

Other objects as well as the novel advantages and uses of the invention should be or will become understood and appreciated after reading the following description and claims and after viewing the drawing in which:

Fig. 1 is a top plan view of a globe valve embodying my invention taken on the line 1—1 of Fig. 2, and Fig. 2 is a fragmentary sectional elevation of the valve of Fig. 1 taken on the line 2—2 of Fig. 1.

The globe valve body generally designated 2 is provided with pipe receiving ends 3 in the usual manner, with a threaded, bonnet coupling end 4 to which a bonnet 5 is adapted to be connected by a coupling nut 6, and with a seat diaphragm 7 about an aperture 8 of which a valve seat 9 is formed. Insofar as the invention is concerned it is more or less immaterial of what metal or the manner in which the valve body is made and it is likewise immaterial whether the seat 9 be formed in the diaphragm as an integral surface thereof or be an independent element secured thereto.

In the embodiment shown threads 10 are integrally formed with the stem 11 and operate in similar threads 12 formed in the bonnet while the lower end of the stem is provided with a circumferential flange 13 providing an outwardly directed shoulder 14 and a terminal end 15 in the shape of a segment of a sphere. The cup-shaped valve disc itself 16 is provided with an internally threaded recess 17 on one side of such depth that the lower end portion of the stem including the shoulder 14 is received wholly therein. Between the bottom end 15 of the stem and the bottom end of the recess 17 a hard metal insert 18 is disposed to serve as a wear plate and absorbs the thrust from the stem during the closing movements of the disc.

The disc in the present instance on the side opposite the recess 17 is provided with a circumferential seat 19 adapted to fit the seat 9 of the diaphragm and with a substantially cylindrical surface portion 20 which is guided during the opening and closing movements of the valve by a similar surface 21 formed on the flange portion 4 of the body while a plurality of sealing recesses 22 extend circumferentially about the cylindrical portion 20. On the same side of the disc 16 and adjacent the recess 17 two or more shallow recesses or depressions 23 are formed at suitable intervals. A nut or disc stem ring, as it is known to the trade, 24 rotatably mounted on and longitudinally slidable along the stem 11 between the threads 10 and the flange 13 is provided with a threaded portion 25 adapted to be received in the threads of the recess 17 and its lower end 26 engages the upwardly or outwardly facing shoulder 14 and serves as a thrust bearing for the stem during opening movement of the valve. Between a small shoulder formed on the nut 24 between its threaded shank portion 25 and its faceted portion a lock washer 27 of distortable metal is disposed and when the parts are assembled in their proper relationships a center punch or the like may be used to drive a portion 28 thereof into one of the recesses 23 to lock it relatively to the disc while a diametrically opposite portion 29 made substantially in the shape shown in Fig. 1 is bent up into contact with one of the facets of the nut to lock the same against relative rotation with respect thereto. In this manner the disc and nut are together locked against relative rotation and no matter how much or in what direction the stem and disc may rotate relatively to one another the nut will not become loosened from a predetermined fixed position with respect to the disc.

From the foregoing it will be clear that I have provided a very simple but effective locking connection between the stem and disc and an arrangement which will give satisfaction over a long period of use. I am aware that lock washers of distortable metal have long been known and used and I do not claim the same to be novel per se but I know of no construction embodying the novel combination of features provided by the present invention much less a construction similar thereto embodying a lock washer of any character. Consequently, I do not desire to be limited to the details of construction of the particular example of my invention illustrated and described but only by the spirit thereof and the scope of the appended claims.

I claim:

1. In a valve construction in combination, a valve disc having a threaded recess in one side, a stem having an end portion rotatably disposed in said recess, a shoulder on said stem end portion facing outwardly of said disc recess, a hollow nut surrounding said stem and rotatable thereon, threadedly engaged with the threads of said recess and providing a thrust bearing for said shoulder, said disc having a second recess adjacent the first said recess, and a lock washer of distortable metal secured between said nut and disc and having a portion engaged in the second said recess and a portion engaged with one of the sides of said nut for securing said nut and disc against relative rotation.

2. In a valve construction, a valve stem having an enlarged end portion, a nut rotatably mounted on said stem, a valve disk having a threaded portion adapted to be engaged by said nut, said disk and nut being constructed to surround the enlarged portion of said stem to secure said portion therebetween, one of said disk and nut members being faceted and the other having an aperture therein and a lock washer of distortable metal disposed between said disk and said nut and having a portion engaging in said aperture and another portion in contact with said facet.

3. In a valve construction, a valve stem having an enlarged end portion, a faceted nut rotatably mounted on said stem, a valve disk having a threaded portion and an aperture adjacent said threaded portion, said threaded portion being adapted to be engaged by said nut, said disk and nut being constructed to surround the enlarged portion of said stem to secure said stem therebetween and a lock washer of distortable metal disposed between said disk and said nut having a portion engaging in said aperture and another portion engaging one of the facets of said nut.

In witness of the foregoing I affix my signature.

CARL A. DOPP.